US008385611B2

(12) United States Patent
Shinzaki (10) Patent No.: US 8,385,611 B2
(45) Date of Patent: Feb. 26, 2013

(54) FINGERPRINT AUTHENTICATION DEVICE AND INFORMATION PROCESSING DEVICE WITH A SWEEP FINGERPRINT SENSOR THAT ACQUIRES IMAGES OF FINGERPRINT AT LEAST TWO DIFFERENT SENSITIVITY LEVELS IN SINGLE SCAN

(75) Inventor: Takashi Shinzaki, Kawasaki (JP)

(73) Assignee: Fujistu Limited, Kawasaki (JP)

( * ) Notice: Subject to any disclaimer, the term of this patent is extended or adjusted under 35 U.S.C. 154(b) by 560 days.

(21) Appl. No.: 11/454,867

(22) Filed: Jun. 19, 2006

(65) Prior Publication Data
US 2007/0223791 A1 Sep. 27, 2007

(30) Foreign Application Priority Data
Mar. 27, 2006 (JP) ................................. 2006-086341

(51) Int. Cl.
*G06K 9/00* (2006.01)
(52) U.S. Cl. ........ 382/124; 382/100; 382/115; 382/181; 382/284; 283/68; 283/69
(58) Field of Classification Search .................. 382/100, 382/115–124
See application file for complete search history.

(56) References Cited

U.S. PATENT DOCUMENTS

| | | | | | |
|---|---|---|---|---|---|
| 5,838,306 | A | * | 11/1998 | O'Connor et al. ........... 345/163 |
| 6,241,288 | B1 | * | 6/2001 | Bergenek et al. ............... 283/67 |
| 6,292,576 | B1 | * | 9/2001 | Brownlee ...................... 382/124 |
| 6,330,345 | B1 | * | 12/2001 | Russo et al. .................. 382/115 |
| 6,888,956 | B2 | | 5/2005 | Muramatsu et al. |
| 7,133,541 | B2 | * | 11/2006 | Haselsteiner et al. ........ 382/124 |
| 7,359,553 | B1 | * | 4/2008 | Wendt et al. .................. 382/192 |
| 7,362,888 | B2 | * | 4/2008 | Abiko ............................ 382/124 |
| 7,505,613 | B2 | * | 3/2009 | Russo ........................... 382/124 |
| 2003/0025897 | A1 | * | 2/2003 | Iwai ................................ 356/71 |
| 2004/0026635 | A1 | | 2/2004 | Lee et al. |
| 2004/0131237 | A1 | | 7/2004 | Machida |
| 2004/0228508 | A1 | * | 11/2004 | Shigeta .......................... 382/124 |
| 2004/0234110 | A1 | * | 11/2004 | Chou ............................. 382/122 |
| 2005/0123177 | A1 | | 6/2005 | Abiko |
| 2005/0129291 | A1 | * | 6/2005 | Boshra ........................... 382/124 |
| 2006/0045315 | A1 | * | 3/2006 | Saitoh et al. .................. 382/115 |
| 2006/0182318 | A1 | * | 8/2006 | Shigeta ......................... 382/124 |
| 2006/0285726 | A1 | * | 12/2006 | Aoki et al. .................... 382/115 |
| 2007/0014443 | A1 | * | 1/2007 | Russo ........................... 382/124 |

FOREIGN PATENT DOCUMENTS

| | | |
|---|---|---|
| EP | 1096417 A2 * | 2/2001 |
| JP | 2001-167258 A | 6/2001 |
| JP | 2002-042117 A | 2/2002 |
| JP | 2002-279413 | 9/2002 |

(Continued)

OTHER PUBLICATIONS

B. Tan, S. Schuckers, Liveness detection using an intensity based approach in fingerprint scanner, Sep. 19-21, 2005, Proceedings of Biometrics Symposium (BSYM2005), p. 9.*

(Continued)

*Primary Examiner* — Matthew Bella
*Assistant Examiner* — Jason Heidemann
(74) *Attorney, Agent, or Firm* — Fujitsu Patent Center (57) ABSTRACT

A fingerprint authentication device includes a sweep fingerprint sensor that acquires images of a fingerprint on a finger at at least two different sensitivity levels in a single scan, and a counterfeit-finger determining unit that determines whether the finger is counterfeit based on the images acquired by the sweep fingerprint sensor.

8 Claims, 9 Drawing Sheets

FOREIGN PATENT DOCUMENTS

| | | |
|---|---|---|
| JP | 2003-50993 A | 2/2003 |
| JP | 2004-258704 | 9/2004 |
| JP | 2004-348726 | 12/2004 |
| JP | 2005-004718 A | 1/2005 |
| JP | 2006-68047 A | 3/2006 |
| WO | WO-03/056502 A1 | 7/2003 |
| WO | WO-2004/023999 A1 | 3/2004 |
| WO | WO-2004/026139 A1 | 4/2004 |
| WO | WO 2006/008396 | 1/2006 |

OTHER PUBLICATIONS

M. Sandstrom, Liveness Detection in Fingerprint Recognition Systems, 2004, Linkopings University, Master Thesis, pp. 41-47.*

Tan, S. Schuckers, Comparison of ridge- and intensity-based perspiration liveness detection methods in fingerprint scanners, Proceedings of SPIE, Mar. 2006.*

Maltoni et al. ["Securing Fingerprint Systems", Editor, "Handbook of Fingerprint Recognition", 2003, Chapter 9, Springer-Verlag, pp. 286-291.*

European Search Report mailed Aug. 2, 2006 in corresponding European Patent Application No. EP06115807.

"Japanese Office Action" mailed by JPO and corresponding to Japanese application No. 2006086341 on Feb. 15, 2011, with English translation.

* cited by examiner

FINGERPRINT AUTHENTICATION DEVICE AND INFORMATION PROCESSING DEVICE WITH A SWEEP FINGERPRINT SENSOR THAT ACQUIRES IMAGES OF FINGERPRINT AT LEAST TWO DIFFERENT SENSITIVITY LEVELS IN SINGLE SCAN

BACKGROUND OF THE INVENTION

1. Field of the Invention

The present invention generally relates to a technology for performing user authentication based on fingerprints and specifically relates to detecting a counterfeit finger by using a sweep fingerprint sensor.

2. Description of the Related Art

Use of biometric information, such as fingerprints, for performing user authentication is becoming popular. It is said that the user authentication based on the biometric information is more reliable than the conventional method of using passwords or identification (ID) cards; because, while the passwords or the ID cards can be stolen or lost, the biometric information can not be stolen or lost. Even with the biometric information, however, there still is a possibility that a third person can maliciously pass as an authentic person.

In the case of a fingerprint for example, it is not very difficult to prepare a counterfeit finger that has the same fingerprint as that on a finger of an authentic user, and be successful in the user authentication by using the counterfeit finger. One approach to prevent that is to differentiate real fingers and counterfeit fingers, and not allow the use of the counterfeit fingers in the user authentication.

Counterfeit fingers can be made of silicon, rubber, gummy material (gelled gelatin solution) and the like. Silicon and rubber do not conduct electricity, so that counterfeit fingers made of silicon or rubber can be comparatively easily detected with capacitance fingerprint sensors or weak-electric-field fingerprint sensors. The gummy material, however, is very similar to the composition of human epidermis, moreover, it conducts electricity, which makes detection of the counterfeit fingers made of gummy material very difficult.

Japanese Patent Publication No. 2002-279413 discloses a technology for determining whether a finger is counterfeit based on a difference of featured information among a plurality of image frames serially acquired from a finger. This technology takes advantage of a phenomenon that the images gradually become clearer when serial images are taken of a real finger, while a counterfeit finger does not show such a transition.

Sweep fingerprint sensors are known in the art. A sweep fingerprint sensor has a reed shape, it acquires images of a fingerprint on a finger when the finger is slide, or "swept", thereon, and based on the acquired images determines whether the fingerprint is authentic. The sweep fingerprint sensors are advantageous in that they are small and less expensive than other fingerprint sensors. However, the sweep fingerprint sensors have a disadvantage that they can not acquire an entire image of a finger at a time so that they are not suitable for the technology described in Japanese Patent Publication No. 2002-279413.

Thus, there is a need of a technology for accurately determining whether a finger used in fingerprint authentication is counterfeit by using a sweep fingerprint sensor.

SUMMARY OF THE INVENTION

It is an object of the present invention to at least partially solve the problems in the conventional technology.

According to an aspect of the present invention, a fingerprint authentication device includes a sweep fingerprint sensor that acquires images of a fingerprint on a finger at least two different sensitivity levels in a single scan; and a counterfeit-finger determining unit that determines whether the finger is counterfeit based on the images acquired by the sweep fingerprint sensor.

According to another aspect of the present invention, an information processing device includes a storage unit that stores therein images of a fingerprint on a finger acquired by a sweep fingerprint sensor at least two different sensitivity levels in a single scan; and a counterfeit-finger determining unit that determines whether the finger is counterfeit based on the images in the storage unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail referring to the accompanying drawings. The present invention is not limited to the embodiments explained below.

Figure 1:
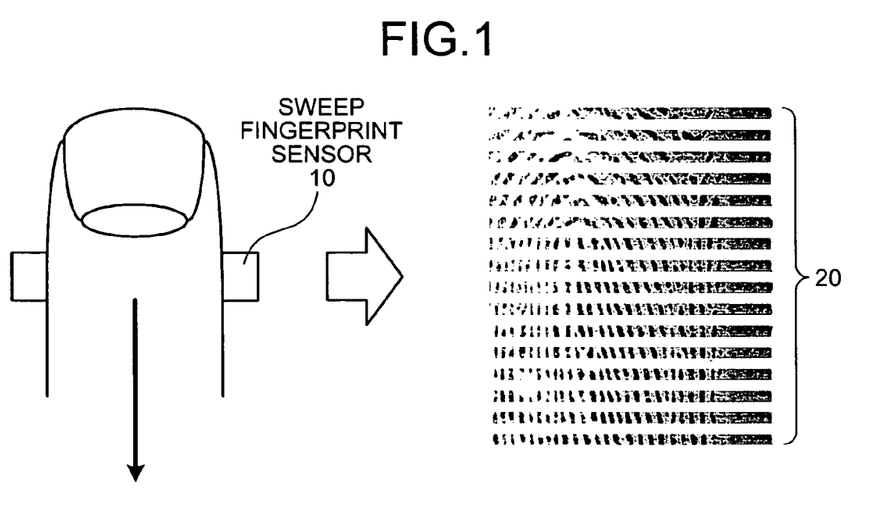
FIG. 1 is a schematic for explaining image acquisition by a sweep fingerprint sensor according to a first embodiment of the present invention.

FIG. 1 is a schematic for explaining image acquisition by a sweep fingerprint sensor 10 according to a first embodiment of the present invention. The sweep fingerprint sensor 10 has a reed shape, and it acquires a plurality of images 20 at different locations of a finger when the finger is swept on it. Those images will be referred to as reed-shape image group. An entire image of a fingerprint can be acquired by combining the images belonging to the reed-shape image group 20.

The sweep fingerprint sensor 10 is configured to change sensitivity levels at a sufficiently high speed when taking images of fingerprint on a finger so that a reed-shape image group 20 is obtained at each of the sensitivity levels. An entire image at each of the sensitivity levels can be obtained by combining the images belonging to the reed-shape image group corresponding to each of the sensitivity levels.

Figure 2A:
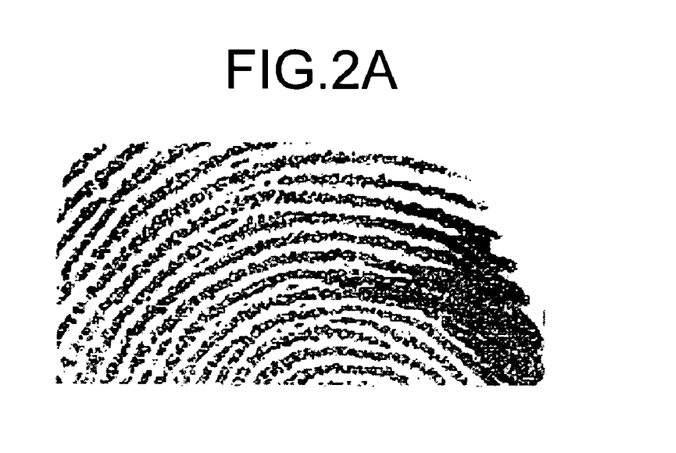
FIGS. 2A to 2C are examples of a mid-sensitivity image, a low-sensitivity image, and a high-sensitivity image, respectively, of a living finger acquired by the sweep fingerprint sensor shown in FIG. 1.
Figure 2B:
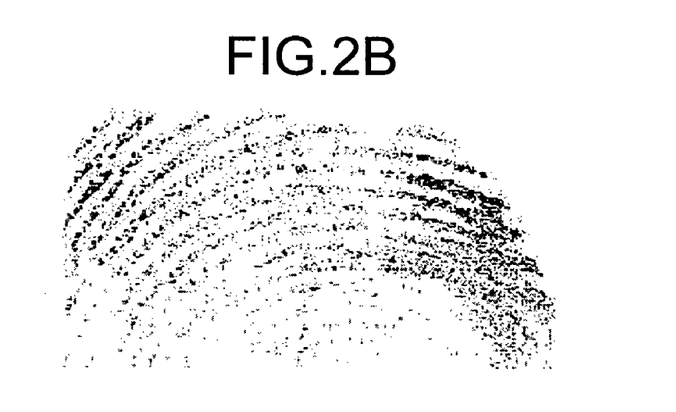
Figure 2C:
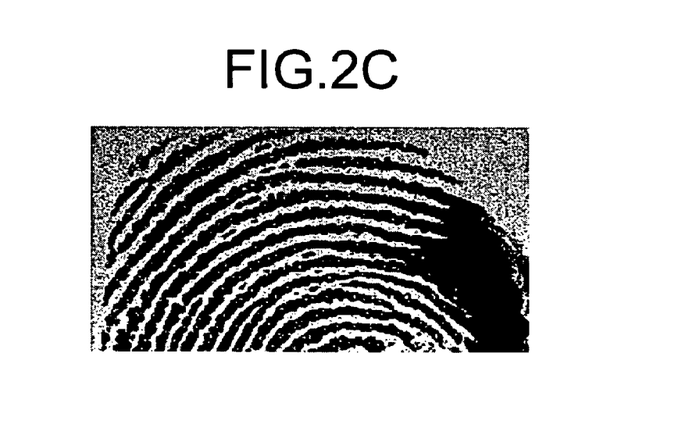
Figure 3A:
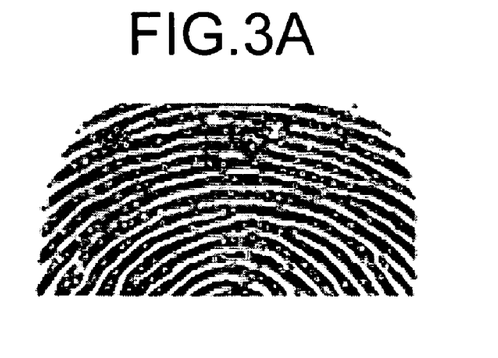
FIGS. 3A to 3C are examples of a mid-sensitivity image, a low-sensitivity image, and a high-sensitivity image, respectively, of a counterfeit finger made from gummy material acquired by the sweep fingerprint sensor shown in FIG. 1.
Figure 3B:
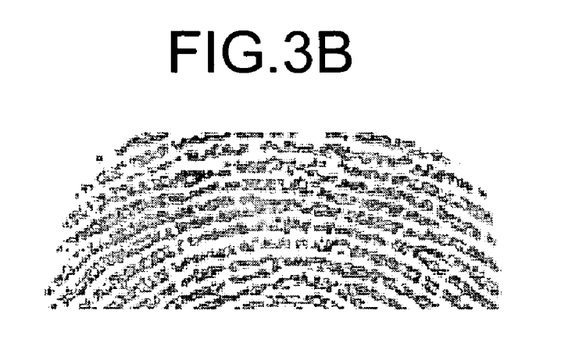
Figure 3C:
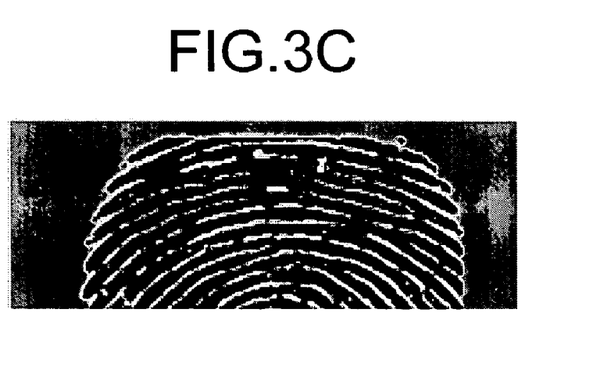

FIGS. 2A to 2C depict examples of entire images of a fingerprint on a real finger, or a "living finger", acquired by the sweep fingerprint sensor 10 at a medium, a low, and a high sensitivity level respectively. FIGS. 3A to 3C depict examples of entire images of a fingerprint on a counterfeit finger, which is made of gummy material, acquired by the sweep fingerprint sensor 10 at the medium, the low, and the high sensitivity level respectively.

When one compares the images in FIGS. 2A, 2B, and 2C with the images in FIGS. 3A, 3B, and 3C, respectively, it can be seen that luminance of pixels corresponding to the ridges on the finger (black or gray area) is generally even in the images of the counterfeit finger; however, varies in the images of the living finger. This difference becomes prominent as the sensitivity level reduces. In other words, it is possible to determine whether a finger is living or counterfeit based on variation in the luminance of the pixels corresponding to the ridges in images of the finger taken at two different sensitivity levels.

More specifically, if the difference between a high-sensitivity image and a low-sensitivity image acquired in one scan of the fingerprint on a finger is less than a predetermined threshold, that finger can be determined as a counterfeit finger. A high-sensitivity image shows very little variation in luminance of the pixels corresponding to the ridges irrespective of whether the image is that of a living finger or a counterfeit finger, which implies that the high-sensitivity image is the most suitable for assessing the luminance of the ridge pixels in the low-sensitivity image.

The difference between the high-sensitivity image and the low-sensitivity image can be a difference in the luminance of the two images, a difference in unevenness in the luminance of the two images, a difference in luminance distribution of the two images, or a difference in the images themselves. A case of determining whether a finger is counterfeit based on the difference in the luminance distribution is explained below.

Figure 4A:
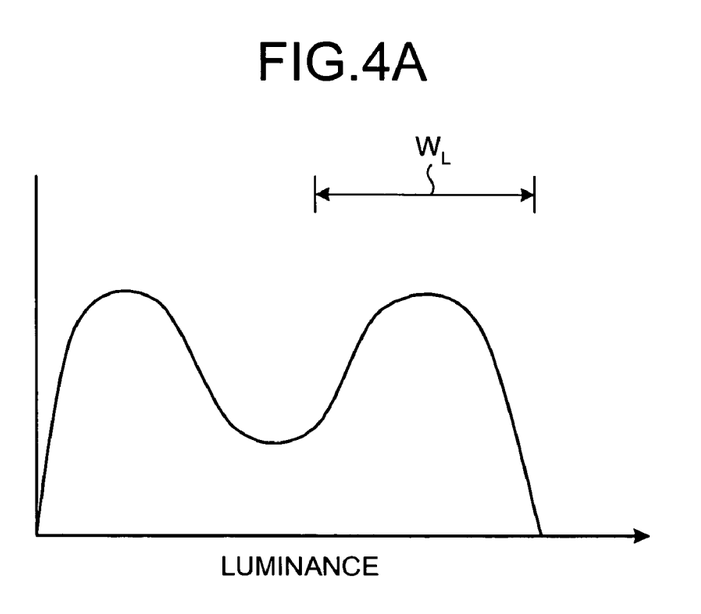
FIGS. 4A and 4B are examples of a luminance distribution in a low-sensitivity image and a high-sensitivity image respectively.

FIG. 4A is an example of luminance distribution on the low-sensitivity image of a fingerprint. The luminance distribution in the low-sensitivity image has two mounts: one in a low-luminance area and another in a high-luminance area. The mount in the low-luminance area corresponds to the ridges on the finger, and the mount in the high-luminance area corresponds to the grooves on the finger.

Figure 4B:
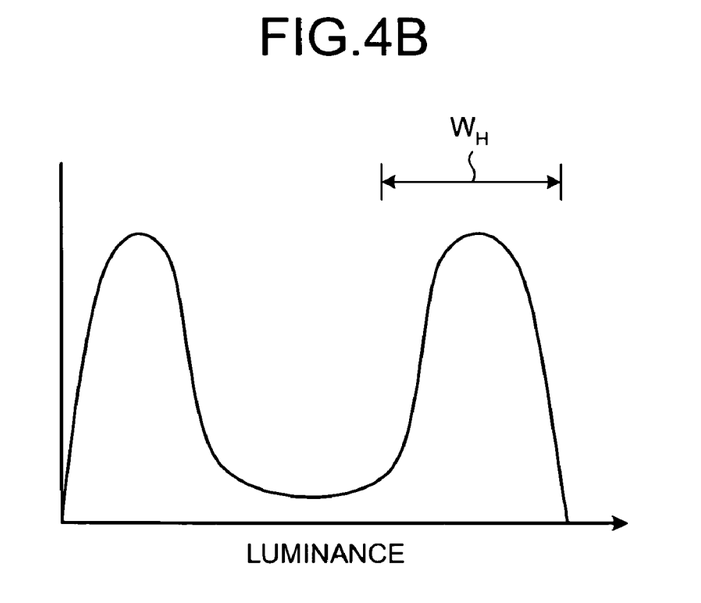

FIG. 4B is an example of luminance distribution on the high-sensitivity image of the fingerprint. The luminance distribution in the high-sensitivity image also has two mounts: one in the low-luminance area and another in the high-luminance area. It can be seen that the mounts in the high-sensitivity image are narrower, prominent, and well defined than those in the low-sensitivity image.

From the profiles of the mounts it can be said that the luminance distribution is distinct in the high-sensitivity image while it is less distinct in the low-sensitivity image. The mounts are gentler in the case of the living finger than in the case of the counterfeit finger because there is more variation in luminance in the case of the living finger than in the counterfeit finger.

Precisely, if the width of a mount on the luminance distribution graph of the low-sensitivity image is $W_L$ and that of a corresponding mount in the high-sensitivity image is $W_H$, then, when the difference $W_L - W_H$ is equal to or more than a predetermined value the finger can be determined as a counterfeit finger.

Figure 5:
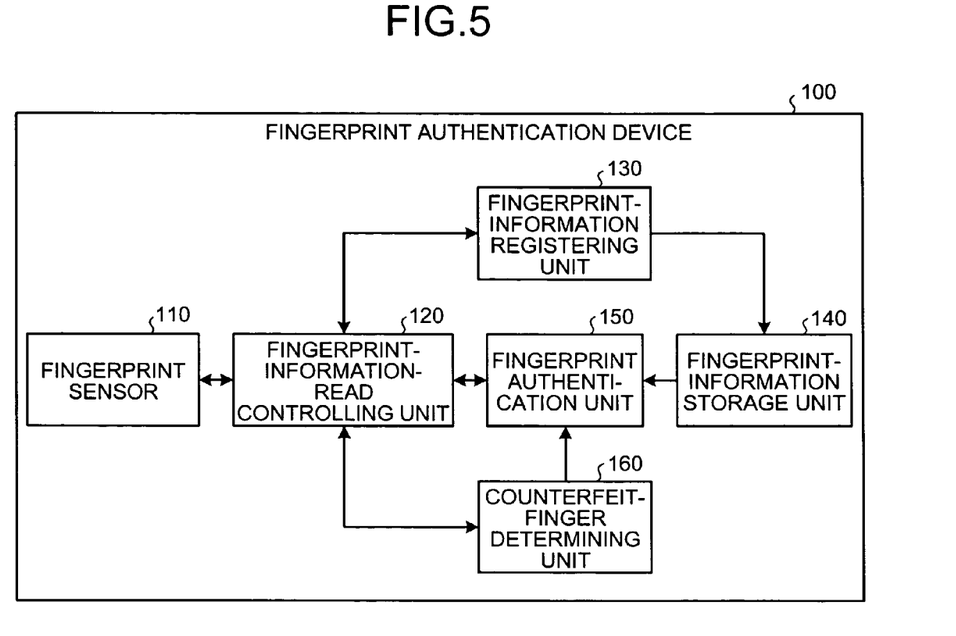
FIG. 5 is a functional block diagram of a fingerprint authentication device according to the first embodiment.

FIG. 5 is a functional block diagram of a fingerprint authentication device 100 according to the first embodiment. The fingerprint authentication device 100 includes a fingerprint sensor 110, a fingerprint-information-read controlling unit 120, a fingerprint-information registering unit 130, a fingerprint-information storage unit 140, a fingerprint authentication unit 150, and a counterfeit-finger determining unit 160.

The sweep fingerprint sensor 10 is used as the fingerprint sensor 110. The fingerprint-information-read controlling unit 120 controls the fingerprint sensor 110 to acquire fingerprint information including a reed-shape image group. To acquire three different reed-shape image groups at a high, a medium, and a low sensitivity levels in one scanning, the fingerprint-information-read controlling unit 120 switches the sensitivity levels of the fingerprint sensor 110 at a sufficiently high speed, for example, in the order of high-medium-low-high-medium-low.

Images can not be acquired, for example, if the finger moves too fast on the fingerprint sensor 110. If images can not be acquired due to any reason, the fingerprint-information-read controlling unit 120 sends out a warning and invalidates the authentication process. The warning can be output by lighting an indicator light (not shown), outputting sound from a speaker (not shown), or some other method.

The mid-sensitivity image is used to perform the finger authentication, and the high-sensitivity image and the low-sensitivity image are used to determine whether a finger is living or counterfeit. However, the high-sensitivity image, the low-sensitivity image, or both, can be used to perform the finger authentication, in which case there is no need to acquire the mid-sensitivity image.

The fingerprint-information-read controlling unit 120 combines the images in the reed-image group corresponding to each of the sensitivity levels thereby producing a fingerprint image corresponding to each of the sensitivity levels. However, it is not mandatory that the fingerprint-information-read controlling unit 120 combines the reed-image groups. In other words, the reed-image group corresponding to each of the sensitivity levels can be passed to subsequent units on the downstream side of the fingerprint-information-read controlling unit 120. Hereinafter, the image information acquired while being controlled by the fingerprint-information-read controlling unit 120 is referred to as fingerprint information no matter whether the images in the reed-image group are combined or not.

The order in which the fingerprint-information-read controlling unit 120 switches the sensitivity levels of the fingerprint sensor 110 need not be controlled so that the opportunity to acquire the image at each of the sensitivity levels is even. In other words, the order can be controlled based on a predetermined pattern so that appropriate fingerprint information can be acquired at each of the sensitivity levels.

The fingerprint-information registering unit 130 receives the fingerprint information acquired by the fingerprint-information-read controlling unit 120, and stores the fingerprint information into the fingerprint-information storage unit 140. Moreover, the fingerprint-information storage unit 140 stores therein authentic fingerprint information of authentic persons.

The fingerprint authentication unit 150 compares the acquired fingerprint information and the authentic fingerprint information, and determines that the acquired fingerprint information is that of an authentic person when the two match. When the fingerprint authentication unit 150 determines that the acquired fingerprint information is that of an authentic person and the counterfeit-finger determining unit 160 determines that the acquired fingerprint information is that of a living finger, only then the fingerprint authentication device 100 determines that the fingerprint authentication is successful. The order of determining whether the acquired fingerprint information is that of an authentic person and whether the acquired fingerprint information is that of a living finger or a counterfeit finger can be reversed.

More specifically, the counterfeit-finger determining unit 160 compares the high-sensitivity fingerprint information with the low-sensitivity fingerprint information, and, when the difference is less than the predetermined threshold, determines that the finger is a counterfeit finger.

The difference between the high-sensitivity fingerprint information and the low-sensitivity fingerprint information can be a difference in the luminance of the two images, a difference in unevenness in the luminance of the two images, a difference in luminance distribution of the two images, or a difference in the images themselves. A case of determining whether a finger is counterfeit based on the difference in the luminance distribution is explained below.

It is desirable to perform the determination of whether a finger is living or counterfeit when acquiring the authentic fingerprint information so that fraudulent fingerprint information cannot be registered as the authentic fingerprint information.

Figure 6:
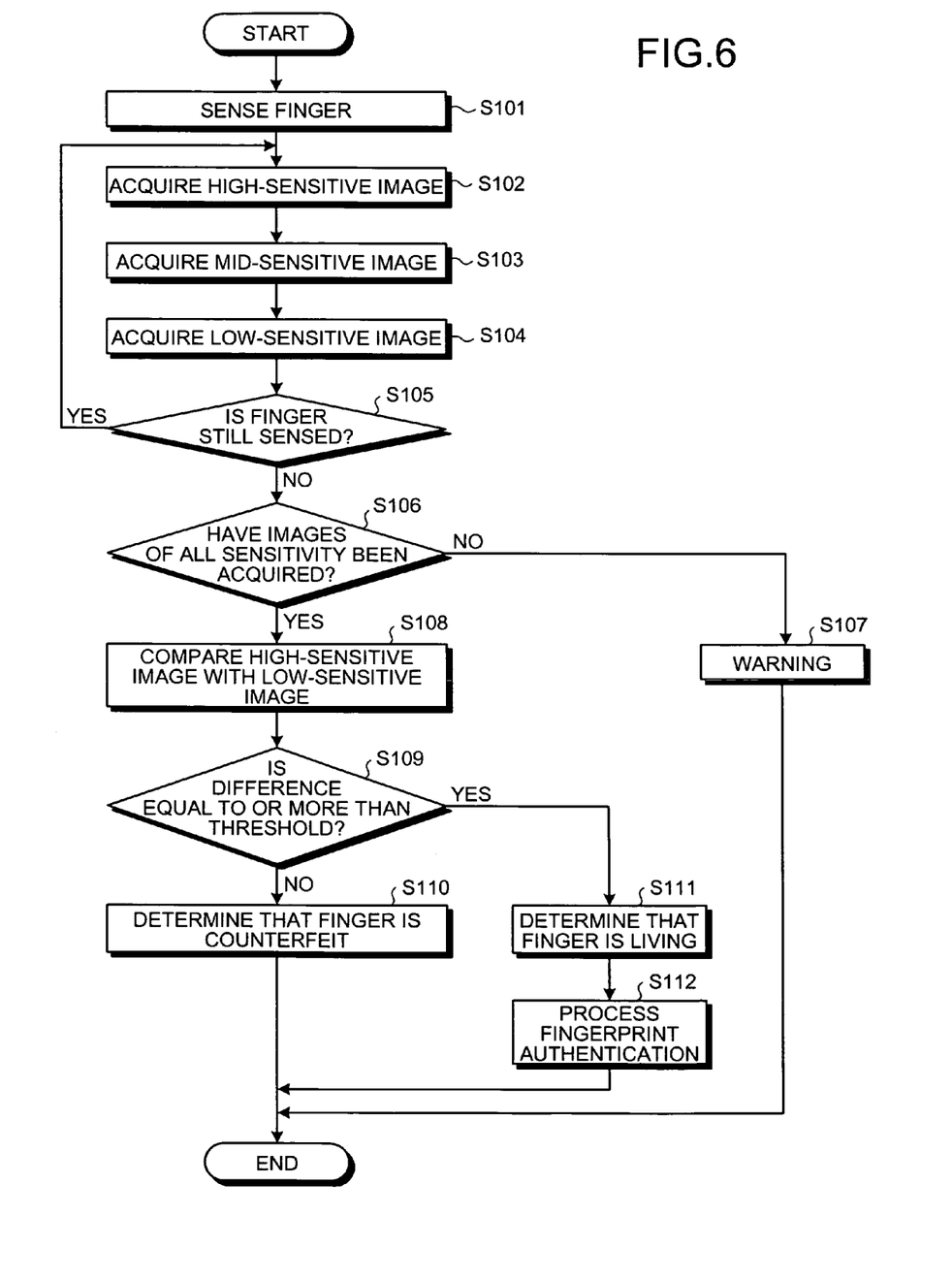
FIG. 6 is a flowchart of a process performed by the fingerprint authentication device shown in FIG. 5.

FIG. 6 is a flowchart of the process performed by the fingerprint authentication device 100. It is assumed that the authentic fingerprint information is already registered in the fingerprint-information storage unit 140.

When the fingerprint sensor 110 senses a finger (step S101), the fingerprint-information-read controlling unit 120 switches the sensitivity levels of the fingerprint sensor 110 from high to mid to low so that the high-sensitivity image (step S102), the mid-sensitivity image (step S103), and the low-sensitivity image (step S104) are acquired.

When the fingerprint sensor 110 still senses the finger (YES at step S105), the process returns to the step S102 and the acquisition of the image is repeated. When the fingerprint sensor 110 does not sense the finger (NO at step S105), it is determined whether appropriate images are acquired at each of the sensitivity levels (step S106). When appropriate images are not acquired (NO at step S106), a warning is sent out (step S107) and after that, the process terminates.

When appropriate images at each of the sensitivity levels are acquired (YES at step S106), the counterfeit-finger determining unit 160 compares the high-sensitivity image with the low-sensitivity image (step S108). When the difference between the two images is less than the predetermined threshold (NO at step S109), the finger is determined as counterfeit and the process terminates (step s110).

When the difference between the two images is equal to or more than the predetermined threshold (YES at step S109), the counterfeit-finger determining unit 160 determines that the finger is living (step S111). Subsequently, the fingerprint authentication unit 150 performs finger authentication by using the mid-sensitivity image and the authentic fingerprint information present in the fingerprint-information storage unit 140 (step S112).

As described above, the fingerprint authentication device 100 acquires fingerprint information on a finger at two different sensitivity levels and based on the difference between the two fingerprint information determines whether the finger is living or counterfeit. A sweep fingerprint sensor is used to acquire the fingerprint information from a finger at two different sensitivity levels.

Fingers can be wet due to sweating. For a wet finger the difference between the high-sensitivity image and the low-sensitivity image is very small, which makes the determination of whether the finger is living or counterfeit difficult. A second embodiment of the present invention relates to a technology for correctly determining whether a finger is living or counterfeit even when the finger is wet.

Figure 7A:
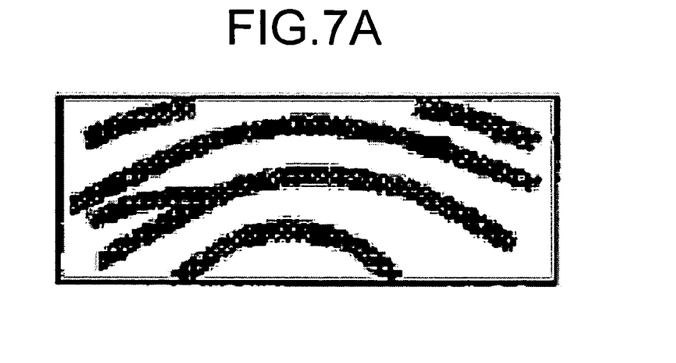
FIGS. 7A to 7C are examples of sweat patterns.
Figure 7B:
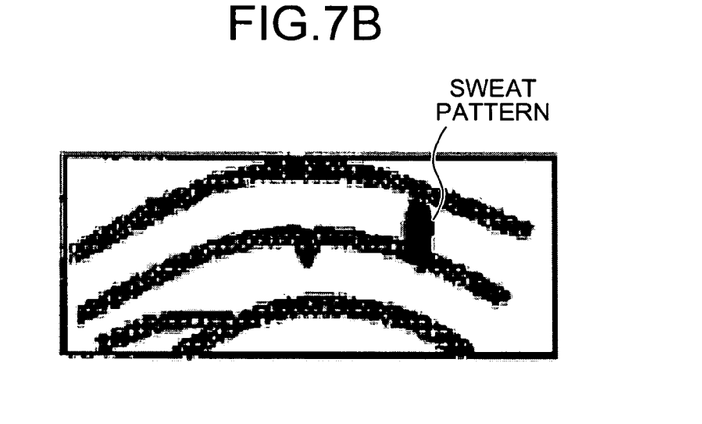
Figure 7C:
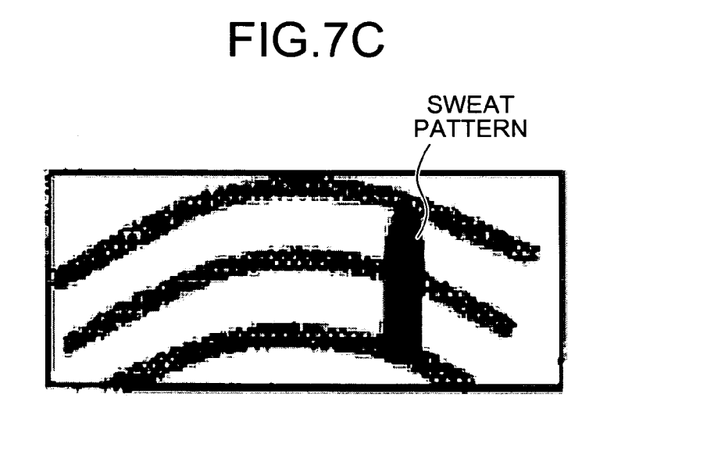

FIGS. 7A to 7C are examples of sweat patterns in a fingerprint. When a sweating finger is swept on a sweep fingerprint sensor, the sweat on the finger is dragged due to a physical contact of the finger and the sweep fingerprint sensor so that a sweat pattern that elongates in the moving direction of the finger appears in the fingerprint. When such a sweat pattern appears in the fingerprint, the finger can be determined as a living finger, because a counterfeit finger can not sweat. Thus, if the methods of the first and second embodiments are combined whether a finger is living or counterfeit can be determined more accurately.

Figure 8:
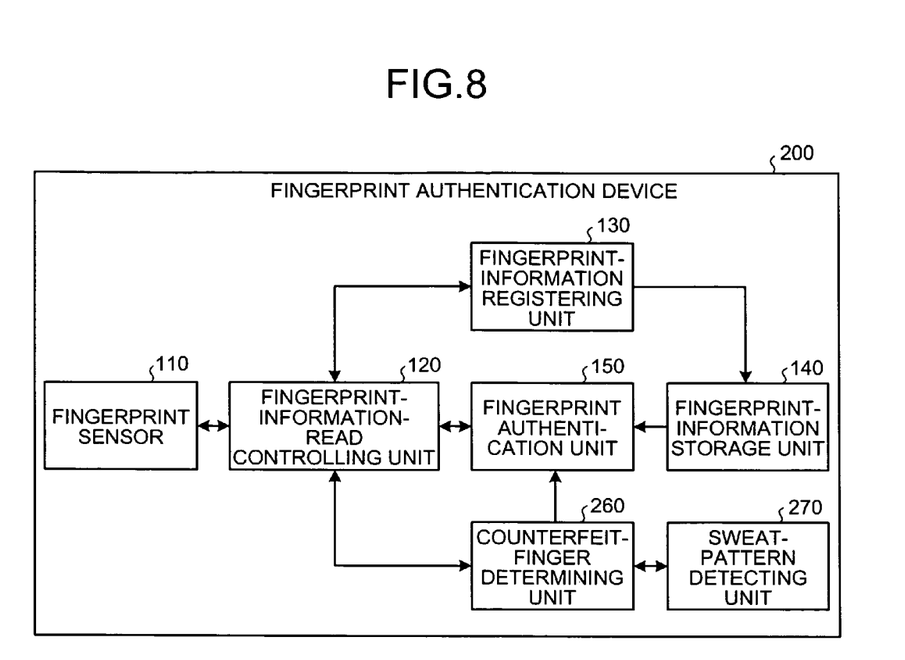
FIG. 8 is a functional block diagram of a fingerprint authentication device according to a second embodiment of the present invention.

FIG. 8 is a functional block diagram of a fingerprint authentication device 200 according to the second embodiment. The fingerprint authentication device 200 includes the fingerprint sensor 110, the fingerprint-information-read controlling unit 120, the fingerprint-information registering unit 130, the fingerprint-information storage unit 140, the fingerprint authentication unit 150, a counterfeit-finger determining unit 260, and a sweat-pattern detecting unit 270. The fingerprint sensor 110, the fingerprint-information-read controlling unit 120, the fingerprint-information registering unit 130, the fingerprint-information storage unit 140, and the fingerprint authentication unit 150 are the same as those shown in FIG. 5, and their explanation is omitted to avoid mere duplication of the explanation.

When the counterfeit-finger determining unit 260 determines that the finger is counterfeit, the sweat-pattern detecting unit 270 detects whether there is a sweat pattern in the fingerprint and informs the result of the determination to the counterfeit-finger determining unit 260. The counterfeit-finger determining unit 260 determines that the finger is living if the sweat-pattern detecting unit 270 detects a sweat pattern in the fingerprint, and determines that the finger is counterfeit finger if the sweat-pattern detecting unit 270 does not detect a sweat pattern in the fingerprint. The detection of the sweat pattern can be performed with respect to fingerprint information of any sensitivity level.

Whether there is a sweat pattern in the fingerprint can be detected by using various techniques. Whether there is a sweat pattern in the fingerprint can be detected, for example, by using techniques proposed by the applicant of the present patent application.

Figure 9:
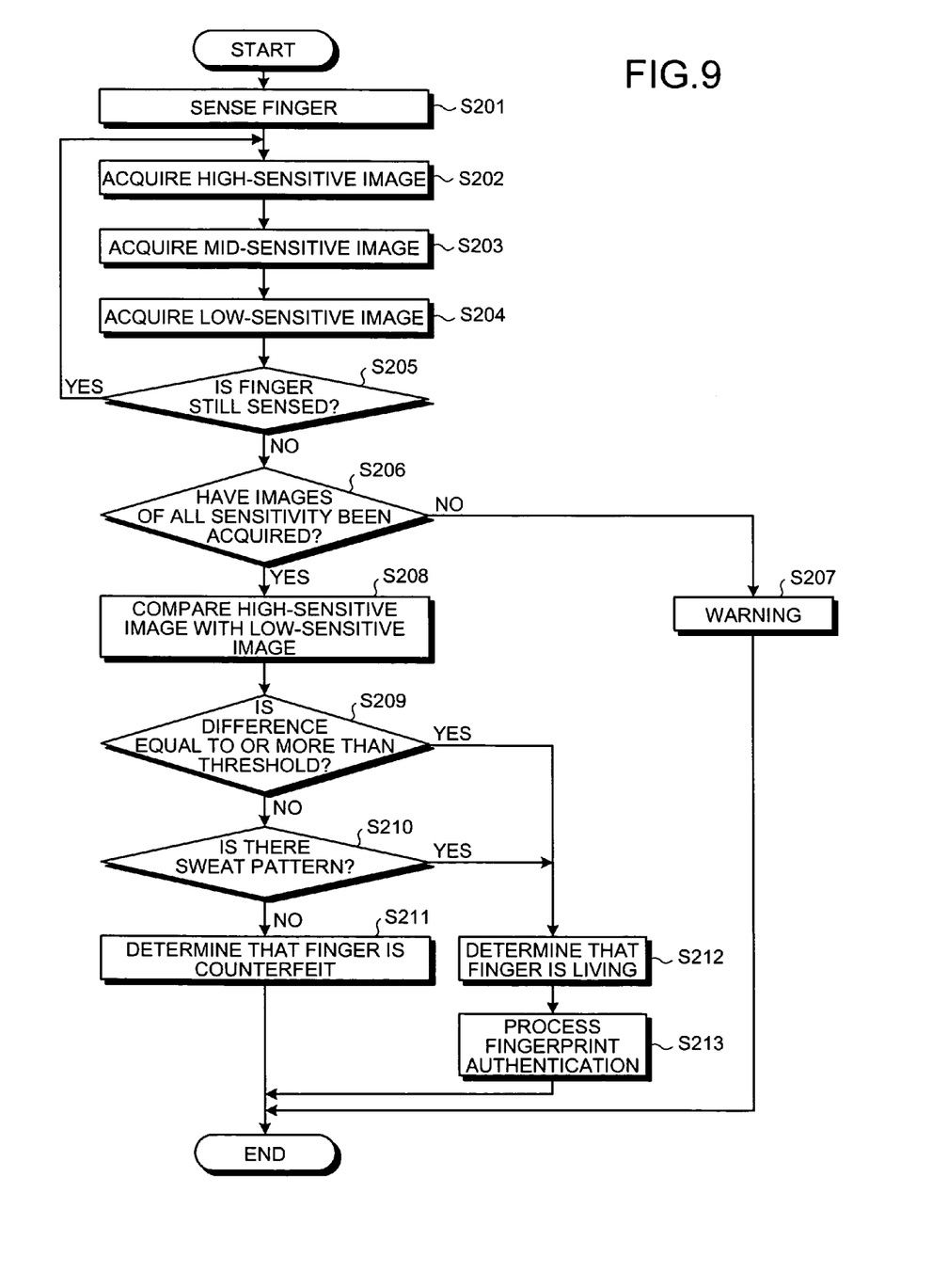
FIG. 9 is a flowchart of a process performed by the fingerprint authentication device shown in FIG. 8.

FIG. 9 is a flowchart of the process performed by the fingerprint authentication device 200. It is assumed that the authentic fingerprint information is already registered in the fingerprint-information storage unit 140.

When the fingerprint sensor 110 senses a finger (step S201), the fingerprint-information-read controlling unit 120 switches the sensitivity levels of the fingerprint sensor 110 from high to mid to low to acquire the high-sensitivity image (step S202), the mid-sensitivity image (step S203), and the low-sensitivity image (step S204) respectively.

When the fingerprint sensor 110 still senses the finger (YES at step S205), the process returns to the step S202 and the acquisition of the image is repeated. When the fingerprint sensor 110 does not sense the finger (NO at step S205), it is determined whether the appropriate images at each of the sensitivity levels are acquired (step S206). When appropriate images are not acquired (NO at step S206), a warning is sent out (step S207), and after that, the process terminates.

When appropriate images at each of the sensitivity levels are acquired (YES at step S206), the counterfeit-finger determining unit 260 compares the high-sensitivity image with the low-sensitivity image (step S208). When the difference between the two images is less than the predetermined threshold (NO at step S209), and when the sweat-pattern detecting unit 270 does not detect a sweat pattern in the mid-sensitivity image (NO at step S210), the finger is determined as counterfeit and the process terminates (step S210).

When either the difference between the two images is equal to or more than the predetermined threshold (YES at step S209) or the sweat-pattern detecting unit 270 detects a sweat pattern (YES at step S210), the counterfeit-finger determining unit 260 determines that the finger is living (step S212). Subsequently, the fingerprint authentication unit 150 performs finger authentication by using the mid-sensitivity image and the authentic fingerprint information present in the fingerprint-information storage unit 140 (step S213).

As described above, the fingerprint authentication device 200 determines whether there is a sweat pattern in the fingerprint information and determines that the finger is living when detecting the sweat pattern in the fingerprint information. A sweep fingerprint sensor is used to acquire the fingerprint information from a finger at two different sensitivity levels.

The sweep fingerprint sensor can be a capacitance fingerprint sensor or a weak-electric-field fingerprint sensor.

While the embodiments are explained assuming that the fingerprint authentication device is configured as a standalone unit, the fingerprint authentication device can also be a part of another device. For example, the fingerprint authentication device can be incorporated in an information processor for identifying an authentic user of the information processor.

According to an aspect of the present invention, whether a finger is living or counterfeit can be accurately determined even by using a sweep fingerprint sensor.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fingerprint authentication device comprising:
a sweep fingerprint sensor that acquires a plurality of images of a fingerprint on a finger in a single scan for the same area of the fingerprint at each of sensitivity levels including low sensitivity level and high sensitivity level; and
a counterfeit-finger determining unit that determines whether the finger is counterfeit by comparing among the plurality of images acquired by the sweep fingerprint sensor, the counterfeit-finger determining unit determining that the finger is counterfeit when a difference in a parameter relating to two images among the plurality of images is less than a threshold and the plurality of images do not include a sweat pattern, the counterfeit-finger determining unit determining that the finger is living when the difference in the parameter relating to two images among the plurality of images is greater than or equal to the threshold or the plurality of images include a sweat pattern, the difference in the parameter including a difference in luminance between corresponding pixels of the two images.

2. The fingerprint authentication device according to claim 1, wherein
the sweep fingerprint sensor acquires the plurality of images of the fingerprint at three different sensitivity levels in a single scan, and
the fingerprint authentication device further comprises a fingerprint authentication unit that determines whether the fingerprint is authentic based on an image of the fingerprint at an intermediate sensitivity level among the plurality of images at the three different sensitivity levels.

3. The fingerprint authentication device according to claim 1, further comprising a warning unit that outputs a warning when the sweep fingerprint sensor cannot acquire an image of the fingerprint on the finger.

4. The fingerprint authentication device according to claim 1, wherein the sweep fingerprint sensor is a capacitance fingerprint sensor.

5. The fingerprint authentication device according to claim 1, wherein the sweep fingerprint sensor is a weak-electric-field fingerprint sensor.

6. The fingerprint authentication device according to claim 1, wherein the parameter includes a variation in luminance of the pixels corresponding to the ridges.

7. A fingerprint authentication device comprising:
a sweep fingerprint sensor that acquires a plurality of images of a fingerprint on a finger in a single scan for the same area of the fingerprint at each of sensitivity levels including low sensitivity level and high sensitivity level; and
a counterfeit-finger determining unit that determines whether the finger is counterfeit by comparing among the plurality of images acquired by the sweep fingerprint sensor, the counterfeit-finger determining unit determining that the finger is counterfeit when a difference in a parameter relating to two images among the plurality of images is less than a threshold and the plurality of images do not include a sweat pattern, the counterfeit-finger determining unit determining that the finger is living when the difference in the parameter relating to two images among the plurality of images is greater than or equal to the threshold or the plurality of images include a sweat pattern, the parameter including distribution in luminance of pixels of each of the two images.

8. An information processing device comprising:
a storage unit that stores therein at least two images of a fingerprint on a finger for the same area of the fingerprint at each of sensitivity levels including low sensitivity level and high sensitivity level acquired by a sweep fingerprint sensor in a single scan; and
a counterfeit-finger determining unit that determines whether the finger is counterfeit by comparing among the at least two images in the storage unit, the counterfeit-finger determining unit determining that the finger is counterfeit when a difference in a parameter relating to two images among the plurality of images is less than a threshold and the plurality of images do not include a sweat pattern, the counterfeit-finger determining unit determining that the finger is living when the difference in the parameter relating to two images among the plurality of images is greater than or equal to the threshold or the plurality of images include a sweat pattern, the difference in the parameter including a difference in luminance between corresponding pixels of the two images.

* * * * *

UNITED STATES PATENT AND TRADEMARK OFFICE
CERTIFICATE OF CORRECTION

PATENT NO.        : 8,385,611 B2                                           Page 1 of 1
APPLICATION NO.   : 11/454867
DATED             : February 26, 2013
INVENTOR(S)       : Takashi Shinzaki It is certified that error appears in the above-identified patent and that said Letters Patent is hereby corrected as shown below:

Title page, Item [73] should read

-- Assignee: Fujitsu Limited, Kawasaki (JP) --

Signed and Sealed this
Twenty-first Day of May, 2013

Teresa Stanek Rea
*Acting Director of the United States Patent and Trademark Office*